(12) United States Patent
Bolshtyansky

(10) Patent No.: US 11,611,393 B1
(45) Date of Patent: Mar. 21, 2023

(54) SPATIALLY RESOLVED MONITORING OF CABLE PERTURBATIONS USING MULTICHANNEL INFORMATION

(71) Applicant: SUBCOM, LLC, Eatontown, NJ (US)

(72) Inventor: Maxim A. Bolshtyansky, Millstone, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 17/469,150

(22) Filed: Sep. 8, 2021

(51) Int. Cl.
H04B 10/079 (2013.01)
H04B 10/60 (2013.01)

(52) U.S. Cl.
CPC ......... *H04B 10/0791* (2013.01); *H04B 10/60* (2013.01)

(58) Field of Classification Search
None
See application file for complete search history.

(56) References Cited

U.S. PATENT DOCUMENTS

| 4,904,050 | A | * | 2/1990 | Dunn | G02B 6/4469 385/12 |
| 5,109,443 | A | * | 4/1992 | Hill | H04B 10/85 398/44 |
| 5,140,636 | A | * | 8/1992 | Albares | H04B 10/85 380/54 |
| 9,025,651 | B1 | * | 5/2015 | Dave | H04B 10/2569 398/208 |
| 9,369,213 | B1 | * | 6/2016 | Kakande | H04L 25/03331 |
| 2007/0274712 | A1 | | 11/2007 | Leppla | |
| 2011/0097075 | A1 | * | 4/2011 | Tanimura | H04B 10/07953 398/1 |
| 2016/0112143 | A1 | * | 4/2016 | Yu | H04B 10/6165 398/76 |
| 2021/0255344 | A1 | | 8/2021 | Kamalov | |

OTHER PUBLICATIONS

"What's shaking? Earthquake detection with submarine cables", Blog; https://cloud.google.com/blog/products/infrastructure/using-subsea-cables-to-detect-earthquakes, 6 pages.
https://www.mdpi.com/2076-3417/9/19/4192/htm; "Advanced DSP for Coherent Optical Fiber Communication", Zhao et al., Appl. Sci. 2019, 9(19), 4192; https://doi.org/10.3390/app9194192, 20 pages.

(Continued)

*Primary Examiner* — Darren E Wolf
(74) *Attorney, Agent, or Firm* — KDB Firm PLLC

(57) ABSTRACT

A monitoring system. The monitoring system may include an optical receiver configured to receive an optical signal, the receiver comprising a plurality of equalizers to partition the optical signal over a plurality of optical channels corresponding to a plurality of optical wavelengths. The monitoring system may also include an analysis component, coupled to the receiver, comprising logic, where the logic is configured to construct a plurality of sensor matrices, corresponding to the plurality of optical channels, based upon the optical signal, after reception at the receiver; determine, using the plurality of sensor matrices, a correlation between at least one pair of sensor matrices corresponding to at least one pair of optical channels of the plurality of optical channels; and determine a location of a perturbation, external to the transmission system, based upon the correlation.

10 Claims, 4 Drawing Sheets

(56) References Cited

OTHER PUBLICATIONS https://en.wikipedia.org/wiki/Least_mean_squares_filter, 7 pages.
K. Choutagunta, I. Roberts and J. M. Kahn, "Efficient Quantification and Simulation of Modal Dynamics in Multimode Fiber Links," in Journal of Lightwave Technology, vol. 37, No. 8, pp. 1813-1825, Apr. 15, 2019.
European Search Report and Written Opinion for European Application No. EP 22177638, dated Nov. 28, 2022, 7 pages.

* cited by examiner

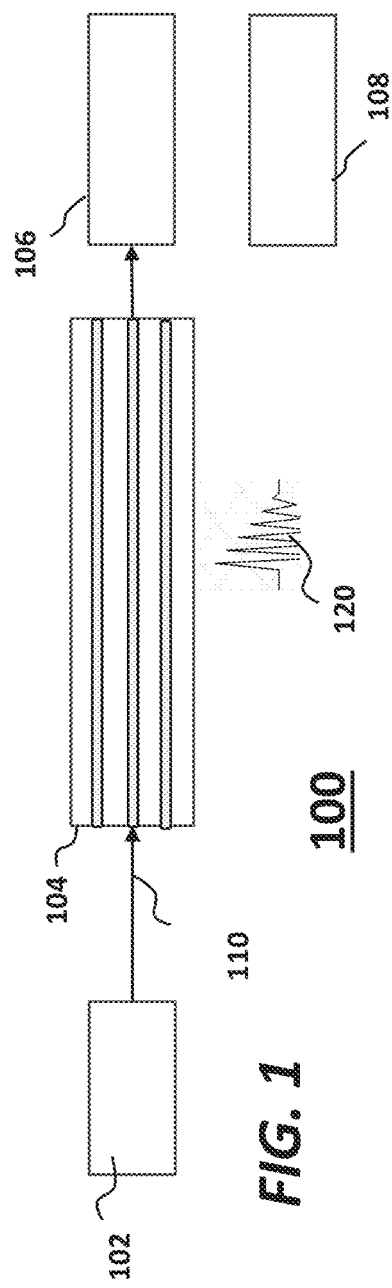
FIG. 1
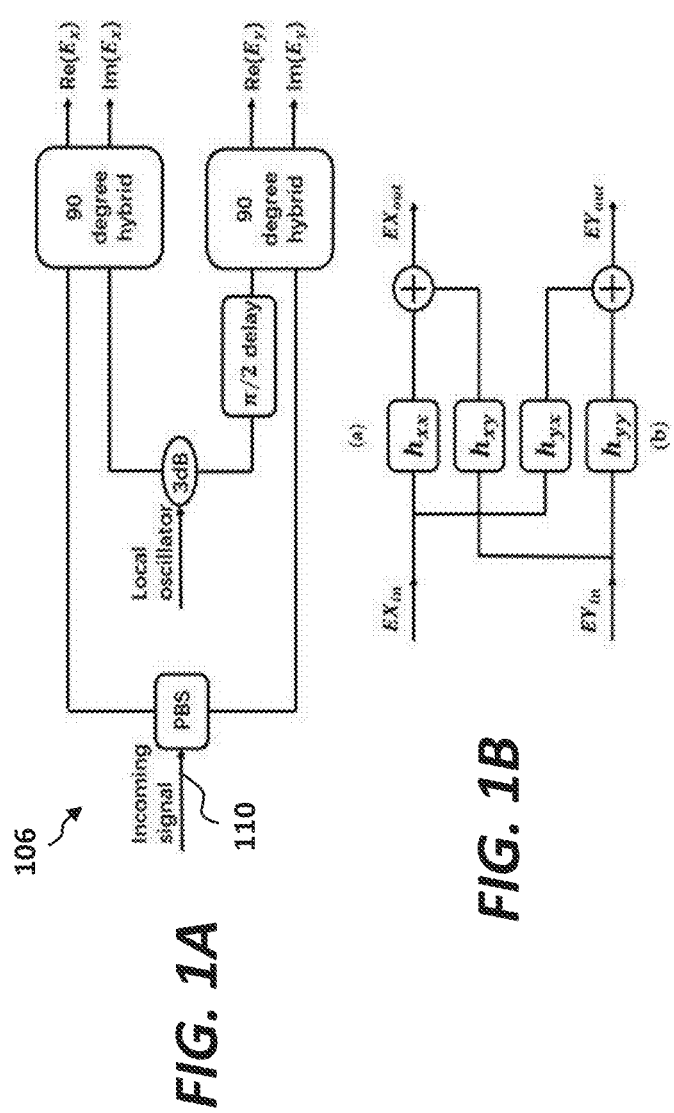
FIG. 1A
FIG. 1B

SPATIALLY RESOLVED MONITORING OF CABLE PERTURBATIONS USING MULTICHANNEL INFORMATION

FIELD OF THE DISCLOSURE

This disclosure relates generally to the field of submarine communication and relates more particularly to techniques for measuring perturbations using line monitoring equipment.

BACKGROUND

Fiber optic cables connect far-flung continents along the ocean floor, and much of the internee's international traffic travels over these cables. Generally, communications over fiber optic cables takes place using pulses of light that may encounter distortions during transmission over thousands of kilometers across an ocean. It has been proposed that perturbations external to an optical fiber, such as earthquakes may be detected by monitoring changes in optical signals, such as state of polarization (SOP) within the fiber. Recently, a change in SOP in an optical subsea cable has been reportedly detected is response to an earthquake that was located more than one thousand kilometers distant from the cable. However, systems and techniques that may detect perturbations whose location is precisely spatially resolved are lacking.

With respect to these and other considerations the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A monitoring system may include an optical receiver configured to receive an optical signal, the receiver comprising a plurality of equalizers to partition the optical signal over a plurality of optical channels corresponding to a plurality of optical wavelengths. The monitoring system may include an analysis component, coupled to the receiver, comprising logic, where the logic is configured to construct a plurality of sensor matrices, corresponding to the plurality of optical channels, based upon the optical signal, after reception at the receiver; determine, using the plurality of sensor matrices, a correlation between at least one pair of sensor matrices corresponding to at least one pair of optical channels of the plurality of optical channels; and determine a location of a perturbation, external to the transmission system, based upon the correlation.

A monitoring system may include a transmitter to generate an optical signal, an optical transmission system, comprising an optical cable, to transmit the optical signal, as well as a receiver, to receive the optical signal. The receiver may include a plurality of equalizers to partition the optical signal over a plurality of optical channels, corresponding to a plurality of optical wavelengths. The monitoring system may also include an analysis component, coupled to the receiver. The monitoring system may include logic to: construct a plurality of sensor matrices, corresponding to the plurality of optical channels, based upon the optical signal, after reception at the receiver. The logic may determine, using the plurality of sensor matrices, a correlation between at least one pair of sensor matrices corresponding to at least one pair of optical channels of the plurality of optical channels; and determine a location of a perturbation, external to the transmission system, based upon the correlation.

A method for monitoring a perturbation may include generating an optical signal; conducting the optical signal over a transmission system, comprising an optical cable, over a plurality of optical channels, where the plurality of channels correspond to a plurality of wavelengths. The method may include detecting the optical signal, after passing through the transmission system, at an equalizer of a coherent receiver, and generating an equalizer matrix based upon the optical signal for each optical channel of at least some optical channels of the plurality of optical channels. The method may also include constructing a plurality of sensor matrices, corresponding to the plurality of optical channels, based upon the equalizer matrix, and extracting a plurality of time-dependent matrices from the plurality of sensor matrices, respectively. The method may also include generating a normalized sensor coefficient function from the plurality of time-dependent matrices, the normalized sensor coefficient function having wavelength as an argument. The method may further include determining a location of a perturbation, external to the transmission system, based upon a characteristic of the normalized sensor coefficient function.

BRIEF DESCRIPTION OF THE DRAWINGS

FIG. 1 is a schematic diagram illustrating an exemplary embodiment of a monitoring system for locating a perturbation, in accordance with the present disclosure;

FIG. 1A illustrates an exemplary coherent receiver, consistent with embodiments of the disclosure;

FIG. 1B illustrates an exemplary butterfly architecture for a receiver, consistent with embodiments of the disclosure;

DETAILED DESCRIPTION

Figure 2:
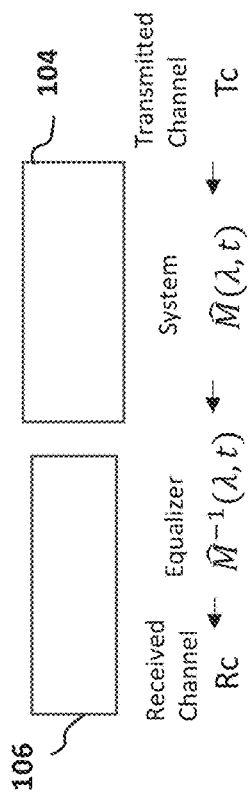
FIG. 2 depicts the general components for creating a sensor matrix, according to embodiments of the disclosure.

The present embodiments may be useful to facilitate detection or perturbances (or perturbations) external to a transmission system, such as a subsea optical cable. According to embodiments of the disclosure, discussed below, the location of a perturbation may be performed using a monitoring system, equipped with a transmitter system, a coherent receiver, and a submarine system that includes an optical cable to carry signals between the transmitter and receiver along multiple optical channels. Generally, a monitoring system of the present embodiments may be integrated into a bidirectional optical communication system. In various embodiments, it will be understood that a transmitter system may represent a plurality of transmitters and a receiver may represent a plurality of receivers, in a bidirectional optical communication system. Moreover, each transmitter may be coupled for bidirectional communication with a dedicated receiver as a transmitter-receiver pair that links the transmitter and receiver through a dedicated communication channel. The monitoring system may further include an analysis component to generate and analyze a plurality of sensor matrices that are constructed from a corresponding plurality of optical channels (also referred to herein merely as "channels") in the optical cable. The present embodiments exploit the differences in signals received among different channels in a multichannel optical cable. By examining the correlation between different sensor matrices constructed from signals received through the different channels, the proximity of a perturbation may be determined.

According to various embodiments of the disclosure, the correlation of sensor matrices is performed by taking into account several factors: 1) The further away (in frequency or wavelength) a given set of optical channels are from one another, the less correlated their sensor matrices become; 2) the closer to the receiver end the perturbation is, the larger are the correlations between given sensor matrices; 3) correlations depend on fiber PMD (polarization mode dispersion), which parameter is a known parameter for a given optical fiber. The accumulated fiber PMD is an entity that destroys the correlations, thus encoding information about the distance from a perturbation point. Said differently, the longer the propagation distance between a receiver and a perturbation point, the more PMD is accumulated, the more the correlation is destroyed.

FIG. 1 is a schematic diagram illustrating an exemplary embodiment of a monitoring system 100 for detecting and locating a perturbation 120, in accordance with the present disclosure. The monitoring system 100 includes a transmitter system 102, such as an assembly of transmitters, each having a laser source, to generate an optical signal, which signal may be a plurality of simultaneously-launched signals, deemed to be a probe beam 110. The probe beam 110 maybe broadened to a targeted bandwidth, in the range of 25 MHz, such as 10 MHz, 25 MHz, 50 MHz, 100 MHz, or similar value according to various non-limiting embodiments. In various embodiments, where the transmitter system 102 represent a plurality of transmitters, and where each transmitter may have a separate laser source, a given laser source may be coupled to a given communication channel. Accordingly, the probe beam 110 may represent multiple signals that are launched from a plurality of laser sources in a respective plurality of transmitters. Likewise, the multiple signals may be transmitted simultaneously over a plurality of communication channels, in particular, at least two communication channels. According to embodiments of the disclosure, exemplary wavelengths for the communication channels may span the known C-band or L-band, near 1550 nm wavelength.

The probe beam 110 may be transmitted through a submarine system 104, including an optical cable (not separately shown), configured to transmit the probe beam 110 over multiple channels, where the multiple channels correspond to the different channels of the transmitter system 102 corresponding to different wavelengths of the probe beam 110. Thus, the multiple channels may be carried over optical fibers of the optical cable. Note that in various embodiments, the submarine system 104 may include an optical cable whose fibers serve both as multiple communication channels for bidirectional communication of (payload) information, as well as to conduct the probe beam 110 over the same multiple communication channels.

The monitoring system 100 may further include a receiver 106, such as a coherent receiver, as described below. As detailed below, the receiver 106 may represent a plurality of equalizers that operate to receive the probe beam over a series of channels, corresponding to different wavelengths. In particular, the receiver 106 may be coupled to receive information over the multiple channels of the monitoring system 100, such as normal information-carrying channels that are used to also conduct the probe beam 110.

The monitoring system 100 may further comprise an analysis component 108, coupled to the receiver 106, to generate and analyze a plurality of sensor matrices that are constructed from a corresponding plurality of channels in the submarine system 104. The analysis component 108 may include a combination of hardware and software, including logic to perform the operations as detailed in the embodiments to follow. Note that the analysis component 108 may communicate with the receiver 106 to extract information received by the receiver 106. For example, the analysis component may be embodied in any combination of computer, processor, software, and may be located at any convenient location of the monitoring system 100, and not necessarily proximate to the transmitter system 102, receiver 106, or submarine system 104.

FIG. 1A illustrates the general architecture of a receiver 106, consistent with embodiments of the disclosure. FIG. 1B illustrates an exemplary butterfly architecture for a receiver 106, consistent with embodiments of the disclosure. The receiver 106 may be configured as in known coherent receivers, with an equalizer having a butterfly structure (EQ) as part of the coherent receiver DSP, as generally illustrated in FIG. 1B.

As shown, an input signal is received, and a local oscillator (LO) is provided to interfere with the input signal, where the LO may have the same frequency as the transmitter laser in the 90-degree optical hybrid device. The input signal may represent the probe beam 110 of FIG. 1. In order to detect both in phase and quadrature components, the input signal may be mixed along One path with the in-phase part of the LO and mixed with the quadrature component in another path through the 90-degree phase delay between the signal and the LO introduced by the 90-degree hybrid. The electrical signal may be digitalized using analog-to-digital converters (ADC)s.

Thus, save for the addition of the analysis component 108, the general architecture and hardware of the monitoring system 100 may be embodied in known components of a known subsea bidirectional communication system, including a plurality of transmitter/receiver pairs that each communicate over a dedicated optical channel.

In various embodiments, the analysis component 108 may extract information transmitted via the probe beam 110 across the submarine system 104 and received by the receiver 106, in order to determine the location of a perturbation that modifies the probe beam 110 in a manner so as to affect the correlation of signals transmitted across the different channels of the submarine system 104. Said differently, the present embodiments may determine the location of a perturbation according to the manner in which the perturbation affects the decorrelation of signals across the different wavelengths corresponding to the different channels of the probe beam.

Following the general example of FIG. 1B, a coefficient h, derived from the input signal, may be used to form an equalizer matrix H, which matrix can be thought of as a compensation for system-induced signal distortions. Often, each element of the equalizer matrix H has multiple taps (each tap associated with a different time delay). This configuration is equivalent of having an optical channel band split into sub-bands, with each sub-band having its own "single tap" butterfly structure equalizer. Consequently, the values of equalizer matrix H for each sub-band can be extracted from the values of multi-tap equalizer coefficients. Thus, each sub-band has its own matrix H, and each sub-band can be treated as a channel.

According to embodiments of the disclosure, the equalizer matrix H may be used to construct a sensor matrix, as described in the following. For each channel, as illustrated in FIG. 2, a system Jones matrix $M(\lambda, t)$ is reconstructed as inverse of the equalizer matrix $H^{-1}(\lambda, t)$. Let's define Average (over time) inverse matrix A: $\hat{A}(\lambda) \equiv <\hat{M}(\lambda, t)>^{-1}$. In accordance with embodiments of the disclosure, once the matrices $M^{-1}$ (or equivalently, H) are known for each channel of a submarine system, the construction of a sensor matrix S may follow. The senor matrix S is generally constructed as a multiplication of estimation of the matrix M (which is an estimation of the transmission system (subsea optical system) with time dependent perturbations) and the Inverse unperturbed system matrix A. Said differently, the sensor matrix S may be calculated as: Sensor Matrix=$\hat{S}(\lambda, t)=\hat{M}(\lambda, t) \cdot \hat{A}(\lambda)$, where the "·" symbol represents a matrix multiplication.

Note that for a given transmission system of a subsea system, each channel has its own sensor matrix S. In this approach, an assumption is that removal of perturbations from the transmission matrix can be achieved by time averaging over time. Such a construction removes differences between channels that may accumulate before the different channels are combined into a single fiber, as well as differences occurring after the different channels split into different paths before detection (with the assumption that the channels are not perturbed over time before combining and/or after splitting). The sensor matrix S, thus constructed, is a function of both time and wavelength (or alternatively, channel index).

In accordance with various embodiments of the disclosure an entity that is used to determine the location of a perturbation is constructed from the sensor matrix S. This entity is termed a normalized sensor coefficient, which coefficient may be constructed as follows:

A time-varying component of the sensor matrix S is extracted as the matrix $\hat{R}(t)$, as detailed below with respect to Eq. (7). Let $r_{i,j}(\lambda, t)$ be elements of matrix $\hat{R}(t)$. Let $s_{i,j}(\lambda, f)$ be the Fourier transform of $r_{i,j}(\lambda, t)$. The perturbation amplitude is proportional to s, and can be extracted at this point. In accordance with some embodiments, this entity can be averaged over wavelength.

For purposes of simplification, an in accordance with some embodiments of the disclosure, a perturbation may be monitored at a given frequency of interest f (e.g., earthquake frequency), and accordingly f will thus be omitted in the formulae to follow. For a given indexes i and j a normalized sensor Coefficient C is introduced, as follows:

$$C(\lambda_1, \lambda_2) \equiv \text{Re}\left[\frac{s(\lambda_1)s^*(\lambda_2)}{\sqrt{|s(\lambda_1)||s(\lambda_2)|}}\right]. \quad (1)$$

In this example, the sensor coefficient C is a function of two wavelengths (or channel indexes). As noted, this normalized sensor coefficient is for a particular perturbation frequency of interest. Alternatively, each perturbation frequency can be characterized by a different sensor coefficient C.

According to embodiments of the disclosure, by monitoring the sensor matrices, perturbations that may affect the transmission system can be detected and located. Because the sensor matrix is a function of wavelength, the behavior of sensor matrix as a function of wavelength may provide an indication of the nature and location of a perturbation. In the absence of a perturbation, the following conditions will apply:

$$\hat{M}(\lambda,t)=<\hat{M}>\equiv \widehat{M_0}(\lambda) \quad (2A)$$

$$\hat{S}(\lambda,t)=I \quad (2B)$$

For a small periodic perturbation $\hat{P}(t)$ at the receiver end of system (where P(t) is the same for any channel), the following conditions will apply:

$$\hat{M}^{pert}(t)=(I+\hat{P}(t))\cdot \widehat{M_0}(\lambda) \quad (3)$$

$$\widehat{M_0}(\lambda) \approx <\hat{M}(\lambda,t)> \quad (4)$$

$$\hat{S}(t)=(I+\hat{P}(t)) \quad (5)$$

In this scenario, as shown in Eq. (5). the sensor matrix behavior does not register any wavelength dependence.

For a perturbation $\hat{P}(t)$ at system beginning, the following conditions apply:

$$\hat{M}^{pert}(t) = \widehat{M_0}(\lambda) \cdot (I + \hat{P}(t)) \quad (6)$$

$$\begin{aligned}\hat{S}(\lambda, t) &= \widehat{M_0}(\lambda) \cdot (I + \hat{P}(t)) \cdot \widehat{M_0}(\lambda)^{-1} \\ &= I + \widehat{M_0}(\lambda) \cdot \hat{P}(t) \cdot \widehat{M_0}(\lambda)^{-1} \\ &= I + \hat{R}(\lambda, t)\end{aligned} \quad (7)$$

Note that in Eq. 7, the matrix $\hat{R}$ represents the time-dependent part of the sensor matrix S. In the above manner, the wavelength (or channel index) behavior in the sensor matrix encodes where a perturbation is located.

Figure 3C:
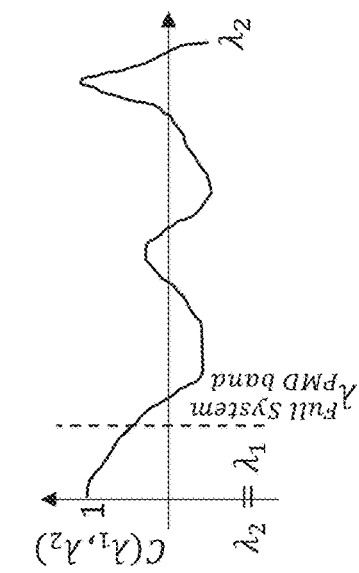
FIGS. 3A-3C illustrate normalized sensor coefficient behavior as a function of wavelength of a probe beam, for three different scenarios corresponding to different perturbance locations.
Figure 3B:
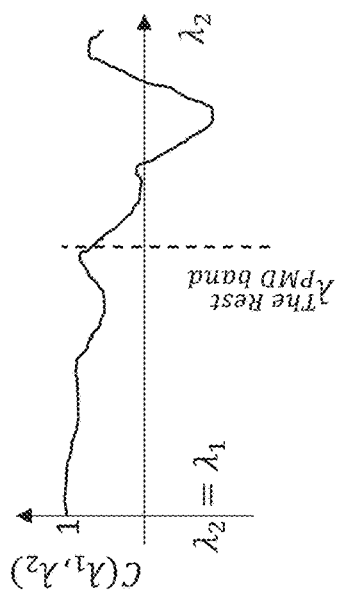
Figure 3A:
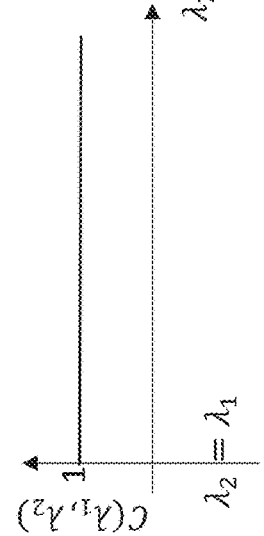

FIGS. 3A-3C illustrate normalized sensor coefficient behavior as a function of wavelength of a channel of a probe beam, for three different scenarios corresponding to different perturbance locations.

In particular, the three graphs shown in FIGS. 3A-3C show behavior of the normalized sensor coefficient C as a function of one of its arguments for three different locations of a perturbation with respect to the transmission system (equivalent to an optical cable). Generally, the variation in sensor coefficient with wavelength is very different among the different cases. The functions shown in FIGS. 3A-3C essentially show the correlation of sensor matrices for different channels, expressed as a function of wavelength. In the case of the perturbation being located at the transmission system end (FIG. 3A), there is no wavelength dependence for sensor coefficient. For FIGS. 3B and 3C, the vertical dashed line shows a characteristic of the normalized sensor coefficient function, in this case a so-called "deviation from 1 location" where the normalized sensor coefficient C becomes essentially less than one, and the delta of wavelengths $\lambda_2-\lambda_1$ (or of channel indexes) relates to the location of perturbation and fiber PMD. The determination of the point where the sensor coefficient becomes essentially less than one may be performed in different manners. One example, is provided in FIG. 4B. In the case of the perturbation being located in the middle of the transmission system (FIG. 3B), there is a gradual decay in C between $\lambda_1$ and $\lambda_2$, with larger fluctuations towards $\lambda_2$. In the case of the perturbation being located in the beginning of the transmission system (FIG. 3B), there is a more rapid initial decay in C between $\lambda_1$ and $\lambda_2$, again with larger fluctuations towards $\lambda_2$.

Figure 4A:
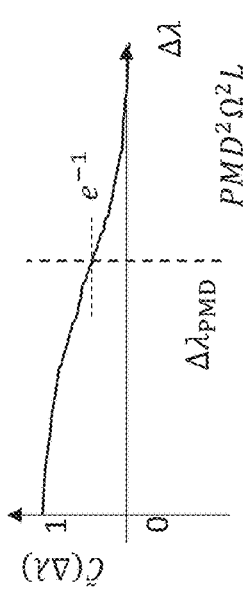
FIG. 4A illustrates three different random sensor coefficient behavior as a function of wavelength.
Figure 4B:
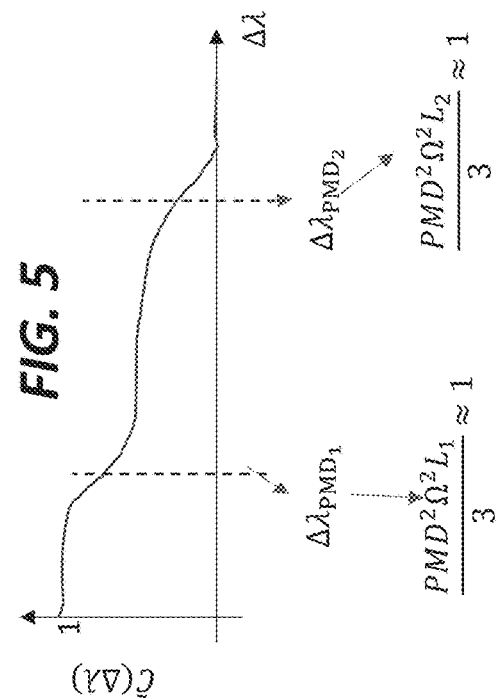
FIG. 4B illustrates an exemplary averaging sensor coefficient function based upon the exemplary functions of FIG. 4A.

Note that for the latter two cases represented by FIG. 3B and FIG. 3C, where normalized sensor coefficient C varies with wavelength, this "deviation from 1 location" is somewhat random when just a single C coefficient is considered. In accordance with various embodiments of the disclosure, the randomness of the normalized sensor coefficient C as a function of one of its parameters may be significantly reduced by performing averaging over the other channels. To explain this latter approach, FIG. 4A illustrates three different random sensor coefficient behaviors as a function of wavelength, while FIG. 4B illustrates an exemplary averaging sensor coefficient function based upon the exemplary functions of FIG. 4A. As particularly illustrated in FIG. 4A, a sensor coefficient $C(\lambda_1, \lambda_2)$ is shown for three different cases where the changes in the value of C as a function of wavelength differ markedly between each case. In each case, the value of C generally decreases, but the fluctuations in the value of C are qualitatively different among the different curves.

Turning now to FIG. 4B, there is shown a curve representing an averaging function $\tilde{C}(\Delta\lambda)$ that is a function of delta lambda (or delta frequency or delta channel indexes). In this function, the value of $\tilde{C}(\Delta\lambda)$ is a monotonically decaying function. This function is better suited to find the "deviation from 1" location, such as the location where the function value is equal to $e^{-1}$. This location in terms of $\Delta\lambda$ is related to the physical location of a perturbation along the transmission system. In particular, the distance L may be determined according to the following equations $$\frac{PMD^2 \Omega^2 L}{3} \approx 1 \qquad (8)$$

where PMD is a system polarization mode dispersion and $\Omega$ is the radial frequency difference between channels, $$\Omega = 2\pi(f_1 - f_2) \approx \frac{2\pi c}{\lambda^2}\Delta\lambda, \qquad (9)$$

where c is the speed of light. Note that according to known approaches, the correlation between polarizations in two channels will decorrelate by a value of 1/e in the presence of PMD along the length of the link L, and separation $\Omega$. Thus, the $\Delta\lambda$ value where $\tilde{C}(\Delta\lambda)$ decreases to 1/e is used in equation (8) to determine the value of L.

In one embodiment, for generating the curve of FIG. 4B, the fitting may be achieved by adjusting just one parameter $\gamma$, as explained below.

As shown in the curves of FIG. 4A, we have normalized sensor coefficient functions $C(\lambda_i, \lambda_2)$ where i is the channel index (FIG. 4A shows i=1, 11, . . . 21) corresponding to different optical channels. As a first matter, the functions C can be transformed into functions of $\Delta\lambda$:

$$C_i(\Delta\lambda) \equiv C(\lambda_i, \lambda_i + \Delta\lambda) \qquad (10)$$

Secondly, finding an average is performed:

$$C_{ave}(\Delta\lambda) = \frac{1}{N}\sum_{i=1}^{N} C_i(\Delta\lambda) \qquad (11)$$

where N is the number of functions $C_i(\Delta\lambda)$ that we have. Here the assumption is that $C_i(\Delta\lambda)$ are normalized to 1 when $\Delta\lambda=0$, so the average function $C_{ave}(\Delta\lambda)$ is automatically normalized to 1 also, that is, the process of averaging should not change that normalization. Therefore $C_{ave}(\Delta\lambda)$ can be best fit by function $\exp(-\gamma(\Delta\lambda)^2)$ by adjusting just a single parameter $\gamma$, since the function $\exp(-\gamma(\Delta\lambda)^2)$ equals to 1 for $\Delta\lambda=0$. Mathematically, the following integral (which can be approximated as sum in numerical evaluation) is minimalized by adjusting the value of $\gamma$:

$$\int_0^{\gamma max} \left(C_{ave}(\Delta\lambda) - \exp(-\gamma(\Delta\lambda)^2)\right)^2 d\Delta\lambda \to \min \qquad (12)$$

Once the value of $\gamma$ is found, the value of $\Delta\lambda_{PMD}$ from FIG. 4.B can be calculated as:

$$\Delta\lambda_{PMD} = 1/\gamma \qquad (13),$$

leading to the value of L, or perturbation distance, from substituting $\Delta\lambda_{PMD}$ into Eqs. 9, in order to determine $\Omega$.

In other embodiments, a normalized sensor coefficient may be determined by averaging over both time and over f. In still further embodiments, to construct an averaging sensor coefficient function, from which function the perturbation location is determined, averaging may take place over 4 coefficients of $s_{i,j}(\lambda, f)$.

While the aforementioned embodiments are generally illustrative of the use of a sensor matrix to detect a single perturbation, when more than one location experiences a perturbation along a transmission system, the function $\tilde{C}(\Delta\lambda)$ may have a more complex shape than those illustrated so far. According to further embodiments of the disclosure, a sensor coefficient function may be analyzed to generate multiple perturbation locations. To illustrate this approach, FIG. 5 shows an exemplary sensor coefficient function for detecting multiple perturbations at different locations.

Figure 5:
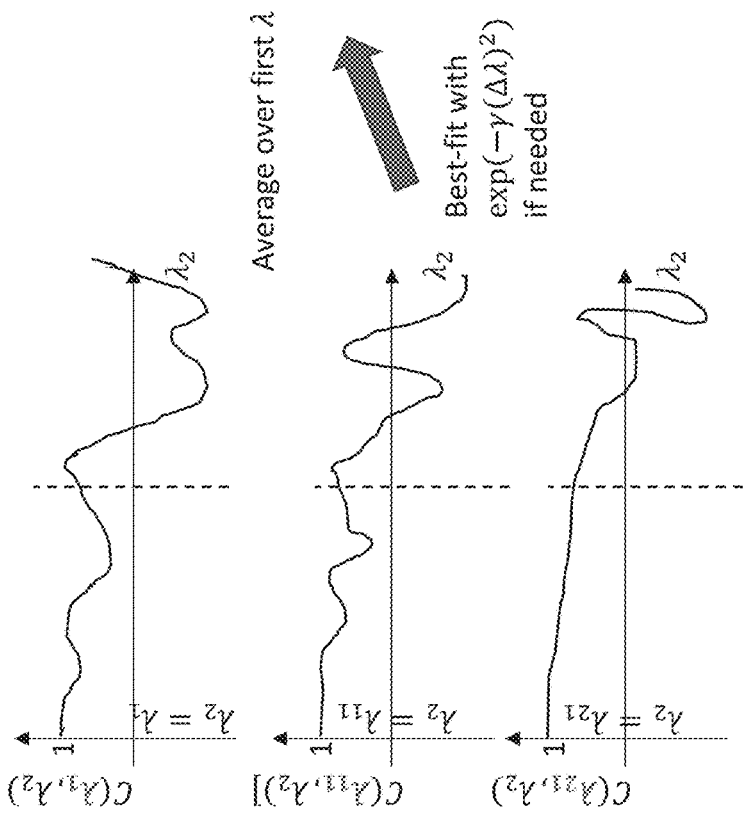
FIG. 5 illustrates an exemplary sensor coefficient function for detecting multiple perturbations at different locations.

Note that the curve shown in FIG. 5 presents a simplification of a sensor coefficient function that may arise in the presence of more than one perturbation. As in FIG. 4, the sensor coefficient function $\tilde{C}(\Delta\lambda)$ function may be an averaging function where the value generally decreases as a function of $\Delta\lambda$. In the illustration of FIG. 5, the assumption is that two perturbations are present at different locations along a transmission system. The sensor coefficient function of FIG. 5 exhibits two distinct regions of rapid decrease in value. A first perturbation location $L_1$ may be determined from the position of the first vertical dashed line, representing $\Delta\lambda_{PMD_1}$ while a second perturbation location $L_2$ may be determined from the position of the second vertical dashed line, representing $\Delta\lambda_{PMD_2}$. In each case, the given $\Delta\lambda$ value may represent the point where the sensor coefficient function, which function may be an average normalized sensor coefficient function, as detailed above, decreases below a respective threshold value. Thus, for the first perturbation location $$\frac{PMD^2\Omega^2 L_1}{3} \approx 1$$

while for the second perturbation location $$\frac{PMD^2 \Omega^2 L_2}{3} \approx 1.$$

The amplitude of each perturbation is proportional to "step size" in the sensor coefficient function. In one embodiment, the shape of the sensor coefficient function may be fitted as combination of two Gaussian functions with different sigmas (width) and amplitude coefficients. The width information of each function carries information about the location of the perturbation, and the amplitude coefficient carries information about perturbation strength. Thus both perturbation location and strength can be extracted from the function of FIG. 5.

Figure 6:
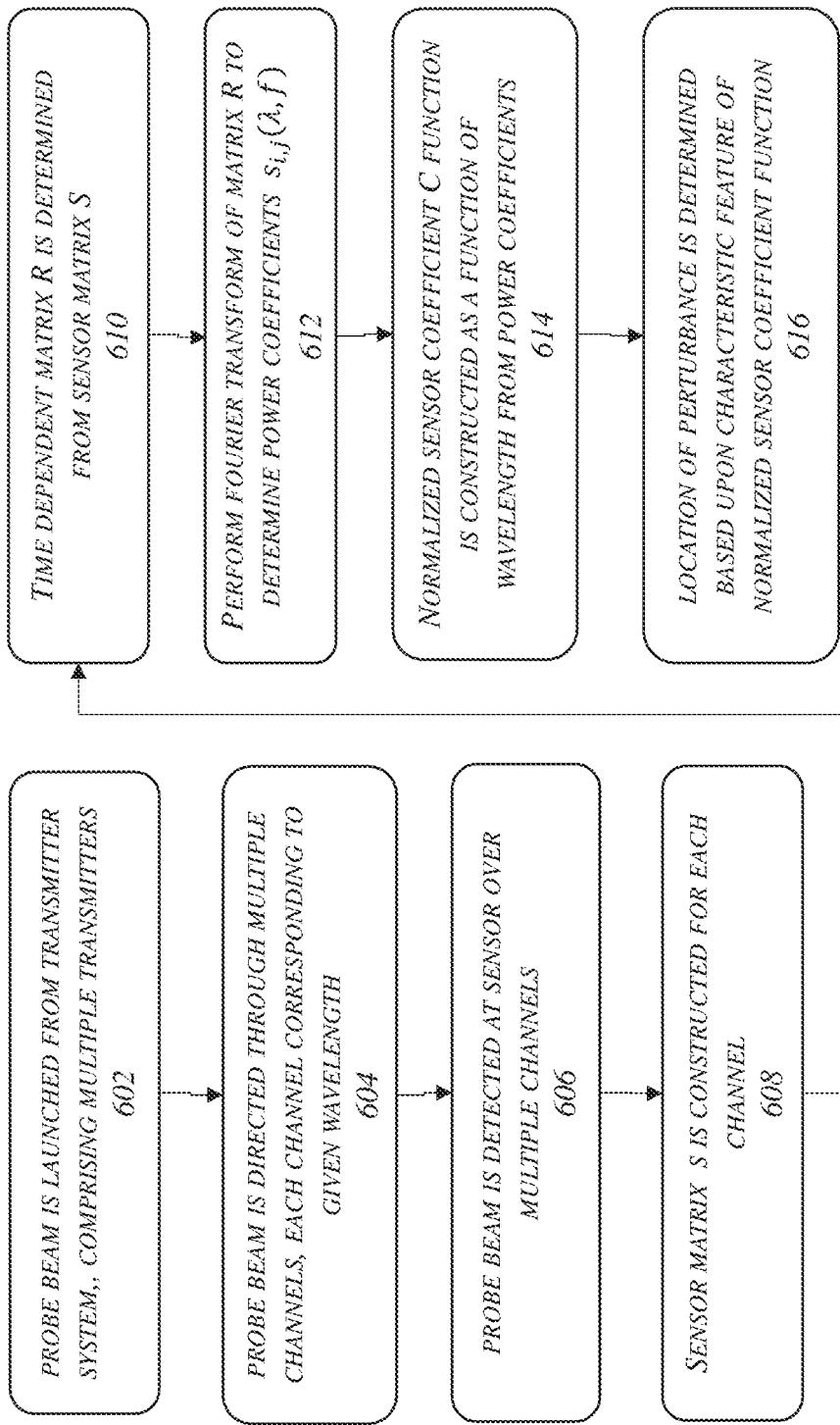
FIG. 6 presents an exemplary process flow.

FIG. 6 presents an exemplary process flow 600, according to some embodiments of the disclosure. At block 602, a probe beam is launched from a transmitter system, including multiple transmitters. In various embodiments, the transmitter system may transmit the probe beam from a plurality of transmitters that each include a laser source and each are coupled to a separate communication channel. As such, the probe beam may constitute a conventional set of signals launched over plurality of wavelengths corresponding to existing information-carrying channels in an existing bi-directional optical communication system.

In some embodiments, the probe beam may be launched over a plurality of channels that may be separate from normal information-carrying channels. In particular, an adjustable wavelength signal may be launched over a dedicated fiber at a wavelength not corresponding to information carrying channels.

At block 604, the probe beam is directed through multiple channels of a transmission system, corresponding to multiple different wavelengths. The multiple channels may extend for hundreds of kilometers along a subsea transmission system, for example. The multiple channels may be combined into a single fiber and may be split into different paths along the transmission system. In various embodiments, the number of channels conducting the probe signal may range between 2 and 300.

At block 606, the probe beam is detected at a sensor over the multiple channels. The sensor may be arranged as a coherent receiver having an equalizer with a butterfly structure, according to some embodiments.

At block 608, a sensor matrix S is constructed for each channel, based upon the detected probe beam over the multiple channels. The sensor matrix S may be constructed as multiplication of estimation of matrix M (which is estimation of system with time dependent perturbations) and an Inverse unperturbed system matrix A.

For example, an equalizer matrix, represented by $M^{-1}$ may be constructed from a system matrix $M(\lambda, t)$ that is generated based upon the transmitted channel Tc for each channel. More particularly, the equalizer matrix is constructed as a Jones matrix Average Inverse (over time): $\hat{A}(\lambda) \equiv <\hat{M}(\lambda, t)>^{-1}$. In particular, the sensor matrix S may be calculated as: Sensor Matrix: $\hat{S}(\lambda, t) = \hat{M}(\lambda, t) \cdot \hat{A}(\lambda)$, where the "·" represents matrix multiplication.

In some variants, the matrix H ($M^{-1}$) may be extracted when channels are mathematically separated into virtual sub-channels (or sub-bands) on the receiver side, where the matrix can be calculated separately for each virtual subchannel. Note that in these variants, additional software may be employed in an analysis component to perform the virtual sub-channel calculations, while not impacting information transmitted through the given information-carrying communication channels of a bidirectional optical communication system. In this case the step over delta lambda in FIG. 4 will be defined by bandwidth of the virtual subchannels (sub-bands).

At block 610, a time-dependent matrix R is constructed from the sensor matrix S. In one implementation the matrix R is extracted from the sensor matrix S as follows;

$$\hat{S}(\lambda,t) = \widehat{M_0}(\lambda) \cdot (I + \hat{P}(t)) \cdot \widehat{M_0}(\lambda)^{-1} = I + \widehat{M_0}(\lambda) \cdot \hat{P}(t) \cdot \widehat{M_0}(\lambda)^{-1} = I + \hat{R}(\lambda,t).$$

At block 612, a Fourier transform of matrix R is performed to determine Sensor Fourier coefficients $s_{i,j}(\lambda, f)$.

At block 614, a normalized sensor coefficient function is constructed as a function of wavelength from the sensor Fourier coefficients. The normalized sensor coefficient function may omit the frequency dependence of the sensor Fourier coefficients in some embodiments. For example, when monitoring the received power over a plurality of wavelengths in the presence of a possible perturbance, the perturbance may be monitored at a given frequency of interest f (e.g., earthquake frequency), so that the normalized sensor coefficient is monitored over wavelength at constant frequency. For indexes i and j the normalized sensor Coefficient may thus be constructed as follows:

$$C(\lambda_1, \lambda_2) \equiv \text{Re}\left[\frac{s(\lambda_1)s^*(\lambda_2)}{\sqrt{|s(\lambda_1)||s(\lambda_2)|}}\right].$$

At block 616, the location of perturbation is determined based upon characteristic feature of normalized sensor coefficient function. In one example, the location of the perturbation may be determined based upon a "deviation from 1 location" where the sensor coefficient C becomes essentially less than one, and the delta of wavelengths $\lambda_2 - \lambda_1$ (or of channel indexes) relates to the location of perturbation and fiber PMD.

In particular, the distance L, defining the location of the perturbation, may be determined according to the following equation:

$$\frac{PMD^2 \Omega^2 L}{3} \approx 1$$

where $\Omega$ represents and $\Omega$ is the radial frequency difference between channels, $\Omega = 2\pi(f_1 - f_2)$, and PMD is a system constant.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A monitoring system, comprising:
an optical receiver configured to receive an optical signal, the receiver comprising a plurality of equalizers to partition the optical signal over a plurality of optical channels corresponding to a plurality of optical wavelengths; and
an analysis component, coupled to the receiver, comprising logic, the logic to:
construct a plurality of sensor matrices, corresponding to the plurality of optical channels, based upon the optical signal, after reception at the receiver;
determine, using the plurality of sensor matrices, a correlation between at least one pair of sensor matrices corresponding to at least one pair of optical channels of the plurality of optical channels; and
determine a location of a perturbation, external to the transmission system, based upon the correlation.

2. The monitoring system of claim 1 further comprising an optical cable coupled to the optical receiver, the optical cable being characterized by a fiber polarization mode dispersion (PMD), wherein the correlation is based at least in part upon the fiber PMD.

3. The monitoring system of claim 2, wherein the optical cable is part of an optical transmission system extending from a first location to a second location, the correlation at the first location has a first value, and wherein the correlation at a second location has a second value, greater than the first value, wherein the second location is closer to the receiver than the first location.

4. The monitoring system of claim 1, wherein each optical channel of the plurality of optical channels is represented by a given sensor matrix of the plurality of sensor matrices, wherein the given sensor matrix is represented by: $\hat{S}(\lambda, t)$, the logic to construct the given sensor matrix from a system matrix $\hat{M}(\lambda, t)$, wherein: $\hat{S}(\lambda, t) = \hat{M}(\lambda, t) \cdot \hat{A}(\lambda)$; wherein $\hat{A}(\lambda) \equiv \langle \hat{M}(\lambda, t) \rangle^{-1}$.

5. The monitoring system of claim 4, the logic to construct the given sensor matrix, : $\hat{S}(\lambda, t)$, from a periodic perturbation, wherein the periodic perturbation is given by $\hat{P}(t)$, wherein $\hat{S}(\lambda, t) = I + \hat{R}(\lambda, t)$, where I represents the given sensor matrix in an absence of the periodic perturbation, and wherein $\hat{R}(\lambda, t) = \overline{M_0}(\lambda) \cdot \hat{P}(t) \cdot \overline{M_0}(\lambda)^{-1}$.

6. The monitoring system of claim 5, wherein the correlation comprises a normalized sensor coefficient, $C(\lambda_1, \lambda_2)$, wherein a value of the normalized sensor coefficient varies as a function of difference in wavelength, between a first wavelength $\lambda_1$, and a second wavelength, $\lambda_2$.

7. The monitoring system of claim 6, the logic to determine the location of the perturbation based upon a value of the difference in wavelength when the value of the normalized sensor coefficient decreases to a level below 1.

8. The monitoring system of claim 6, wherein the logic to determine the location of the perturbation by averaging a plurality of normalized sensor coefficient functions, as a function of difference in wavelength.

9. The monitoring system of claim 8, the logic to determine the location, L, of the perturbation by determining a fiber polarization mode dispersion (PMD), wherein $$\frac{PMD^2 \Omega^2 L}{3} \approx 1.$$

10. The monitoring system of claim 7, the logic to determine a plurality of locations $L_1$, $L_2$, of a plurality of perturbations, based upon a plurality of values of the difference in wavelength when the value of the normalized sensor coefficient decreases to a plurality of respective threshold values.

* * * * *